June 16, 1959  
L. R. HAGUE  
2,891,234  
VEHICLE SIGNALLING SYSTEM FOR INDICATING  
THE AMOUNT OF APPLIED BRAKE PRESSURE  
Filed Nov. 15, 1957

INVENTOR  
Lou R. Hague.  
BY  
ATTORNEY

United States Patent Office 2,891,234
Patented June 16, 1959

2,891,234

VEHICLE SIGNALLING SYSTEM FOR INDICATING THE AMOUNT OF APPLIED BRAKE PRESSURE

Lou R. Hague, Meadville, Pa.

Application November 15, 1957, Serial No. 696,808

4 Claims. (Cl. 340—69)

This invention relates to a vehicle brake signalling system and more particularly to an automotive signalling system for indicating both the application of brake pressure and the rate of deceleration of the automobile.

As is well known, present-day automobiles are equipped with tail lamps which indicate the application of brake pressure to the driver of a following vehicle, the arrangement being such that when brake pressure is applied, a switch is closed which completes a circuit to energize the tail lamps. Although a signalling system of this sort indicates that the brakes in the vehicle ahead have been applied, it does not indicate the amount of brake effort being applied; and, consequently, it is not apparent whether the forward vehicle is merely slowing down or is making an abrupt stop. This condition has resulted in many accidents, especially when icy or slippery road conditions prevail.

It is a principal object of this invention to provide a vehicle brake signalling system in which both the application of brake pressure and the amount of brake pressure are indicated. With such a system, the driver of a vehicle will be appraised as to whether or not the vehicle in front of him is merely slowing down or coming to an abrupt stop.

Another object of the invention is to provide a signalling system of the type described above which may easily be adapted for use in conventional automotive signalling systems.

Another object of the invention is to provide a new and improved fluid pressure responsive rheostat.

A still further object of the invention is to provide an automotive brake signalling system which is economical and compact in construction.

The above and other objects and features of the invention will become apparent from the following detailed description taken in connection with the accompanying drawings which form a part of this specification and in which.

Figure 1:
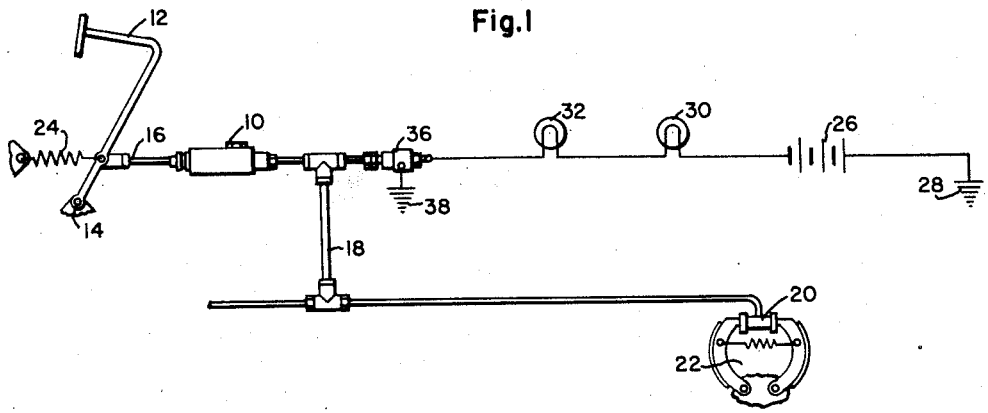
Figure 1 is a schematic diagram of a conventional automotive brake system incorporating the signalling system of the present invention.

Referring to Fig. 1, the automotive brake system shown comprises a master cylinder 10 which is operated by a foot pedal 12. The pedal 12 is pivoted to the frame of the automobile at 14 and is connected through a linkage 16 to the master cylinder 10, the arrangement being such that when pedal 12 is moved in a clockwise direction, the plunger in master cylinder 10 will pressurize the fluid brake lines 18 which lead to the operating cylinders 20 in each of the brakes. Although only one brake 22 is shown in Fig. 1, it will be readily understood that in an actual installation, two or more similar brakes will be employed. When pressure on brake pedal 12 is removed, spring 24 forces it to rotate counterclockwise back to its original position where the pressure in brake lines 18 is removed.

The signalling system itself comprises a source of potential, such as battery 26, having one terminal connected to the frame of the automobile as indicated by the ground connection 28. The other terminal of battery 26 is connected through two signalling lamps 30, 32 and a fluid pressure responsive rheostat 36 to ground at 38. In operation, when brake pedal 12 is moved in a clockwise direction, the fluid pressure in brakes lines 18 will cause the fluid pressure responsive rheostat 36 to first complete the circuit between battery 26 and lamps 30 and 32, and thereafter to steadily decrease the resistance of the circuit whereby the intensity of the lamps is increased. As will be understood, the intensity of the lamps will increase as the brake pressure in lines 18 increases, thereby indicating increased braking effort.

Figure 2:
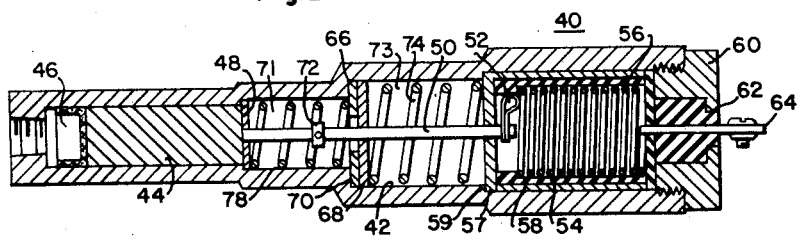
Fig. 2 is a sectional view of one embodiment of the fluid pressure responsive rheostat used in the signalling system shown in Fig. 1.

In Fig. 2 one embodiment of the rheostat 36 is shown and comprises a metal body member 40 having a central bore 42 extending therethrough. The bore 42 is divided into four sections or chambers, each of which has a progressively decreasing diameter, starting from right to left. Reciprocable within the extreme left-hand chamber of the bore is a piston 44. The area, identified as 46, between the left end of piston 44 and the end of bore 42 defines a variable volume chamber which is adapted for connection to the brake lines 18 such that when brake pressure is applied, the piston 44 is forced to move to the right.

Abutting the right end of piston 44 is a disc 48 having a rod 50 integrally attached thereto. The rod 50 extends along the central axis of the bore 42 and has an electrical contact member 52 affixed to its right end. This contact member normally rests on the inner periphery of an annular insulating insert 54. However, when piston 44 moves to the right in response to the application of brake pressure, contact member 52 will be moved to the right also where it comes into contact with a helical coil of conductive material 56 which is secured to the inner periphery of a recessed portion of insert 54.

The insert 54 is surrounded by an outer metal liner 58, and these two members are carried between a circular plate 57 which abuts annular shoulder 59 and an annular cap 60 which is threaded into the right end of bore 42. The central portion of cap 60 is fitted with an insulating insert 62 which has a contact member 64 extending therethrough. One end of the contact member 64 engages the right end of coil 56; whereas the other end is adapted for connection to the electrical circuit for energizing lamps 30 and 32.

Midway between plates 48 and 57, the diameter of bore 42 changes to form two chambers 71 and 73. Two annular plates 66 and 68 are carried within chamber 73 where they rest against the annular shoulder 70. Plate 66 has an opening in the central portion thereof to permit a collar 72 on shaft 50 to pass therethrough. This collar, then, will engage plate 66 and compress helical spring 74 which is located between plates 68 and 57. A second helical spring 78 is disposed between plates 48 and 66.

To construct the rheostat, the cap 60 is first removed and piston 44 is inserted into bore 42. The assembly of plate 48, rod 50, plates 66 and 68, plate 57 and springs 74 and 78 are assembled outside of the bore 42 and are then inserted into the bore. Finally, the annular collars 54 and 58 are inserted into the bore and the cap 60 is threaded into its right end whereby all of the elements are forced into the positions shown.

In operation, when fluid under pressure is applied to the variable volume chamber 46, piston 44 and shaft 50 will be forced to the right. Initially the brake pressure will be relatively slight. During the initial travel of piston 44 in response to this light pressure, the light spring 78 will be compressed. This enables slight variations in brake pressure to be indicated. However, after collar 72 engages plate 68, spring 74 will start to compress. The braking system is now operating at a higher pressure and the compression of spring 74 will show variations in this greater degree of pressure. In this respect, it is apparent that spring 74 has a higher force-deflection ratio than spring 78.

Figure 3:
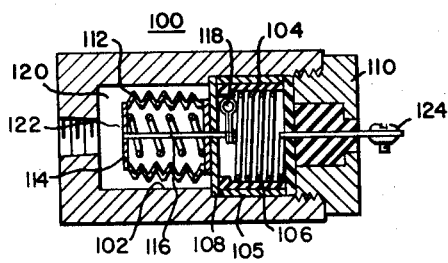
Fig. 3 is another embodiment of the aforesaid fluid pressure responsive rheostat.

In Fig. 3 another embodiment of the rheostat is shown which comprises a body member 100 having a bore 102 extending therethrough. The assembly at the right hand of this embodiment is similar to that shown in Fig. 2 and comprises an annular insulating insert 104 having a helical coil 106 of conductive material affixed to its inner periphery. Surrounding the insulating insert 104 is an annular metal insert 105 which is held between a circular plate 108 and end cap 110 which is threaded into the right end of the bore 102. In this case, however, the piston of the embodiment of Fig. 2 is replaced by an expansible bellows 112 which is affixed to plate 108. The bellows is provided with an end plate 114 having a shaft 116 affixed thereto. The other end of the shaft 116 is provided with an electrical contact member 118 as was the case in Fig. 2. The helical spring 120 disposed between plate 108 and plate 114 urges the plate 114, shaft 116 and electrical contact member 118 to the right as shown. When fluid pressure is applied to chamber 120 from brake lines 18, the bellows 112 will be compressed whereby the contact member 118 will move to the right, thereby decreasing the electrical resistance of the circuit for lamps 30 and 32.

The entirety of the rheostats shown in Figs. 2 and 3 except the helical coil 56 or 104 will be electrically connected to the frame of the automobile. In this respect, the electrical contact member 52 or 118, whatever the case may be, will also be electrically connected to the automobile frame. The right end of helical coil 56 or 104 is then connected through contact 64 or 124 to the lamps 30 and 32 which are, in turn, connected to battery 26. It can be seen, therefore, that as brake pressure is applied, the electrical resistance of the circuit containing lamps 30 and 32 is progressively decreased, thereby indicating that increased brake pressure is being applied.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that either of the rheostats of Figures 2 or 3 could be modified to fit into the receptacle for a conventional stop light switch. Furthermore, the helical coil 56 or 104 could be replaced by another type of resistance element; and piston 44 or bellows 112 could be replaced by a pressure-responsive diaphragm.

I claim as my invention:

1. A fluid pressure responsive rheostat for controlling the amount of current supplied to a vehicle signalling lamp comprising, in combination, an electrically conductive body member having a bore extending therethrough, an elongated resistance element extending parallel to the axis of said bore at one end thereof, means insulating said resistance element from said body member, a fluid pressure responsive member reciprocably carried in the other end of said bore, a movable contact member reciprocable along the axis of said bore and having one end which engages said fluid pressure responsive member and another end which slides along said resistance element, said body member, fluid pressure responsive member and contact member being electrically interconnected, a plurality of spring devices having different force-deflection ratios for urging said contact member and said fluid pressure responsive member toward the end of said bore opposite said resistance element, and connections for applying fluid pressure to the fluid pressure responsive member whereby the last-mentioned member and the contact member are urged toward said one end of the bore against the force of said spring devices.

2. A fluid pressure responsive rheostat for controlling the amount of current supplied by a voltage source to a vehicle signalling lamp comprising, in combination, a body member having a bore extending therethrough, a helical coil of resistance material posititoned on the periphery of one end of said bore, a piston member reciprocably carried in the other end of said bore, a variable volume chamber at one end of said piston member, a movable contact member reciprocable within said bore and arranged to engage said helical coil, a plurality of spring devices having different force-deflection ratios for urging said movable contact member toward the end of said piston member opposite said variable volume chamber, connections for supplying fluid under pressure to said variable volume chamber, and means for connecting said movable contact and the end of said helical coil furthest removed from said piston member in a series circuit arrangement including said lamp and said voltage source.

3. A fluid pressure responsive rheostat for controlling the amount of current supplied to a vehicle signalling lamp comprising, in combination, an electrically conductive body member having a bore extending therethrough, an elongated resistance element extending parallel to the axis of said bore at one end thereof, means insulating said resistance element from said body member, a fluid pressure responsive member reciprocably carried in the other end of said bore, a movable contact member reciprocable along the axis of said bore and having one end which engages said fluid pressure responsive member and another end which slides along said resistance element, said body member, fluid pressure responsive member and contact member being electrically interconnected, a pair of separable abutting elements disposed in said bore substantially midway between the resistance element and the fluid pressure responsive member, a first spring positioned between an end of the fluid pressure responsive member and a first of said abutting elements, a second spring positioned between said resistance element and the second of said abutting elements, said second spring having a higher force-deflection ratio than said first spring, means on said movable contact member for engaging the second element after said fluid pressure responsive member and contact member have moved forward by a predetermined amount to compress said first spring, and connections for applying fluid pressure to the fluid pressure responsive member whereby the last-mentioned member and the contact member are urged toward said one end of the bore against the force of said first and second springs.

4. A fluid pressure responsive rheostat for controlling the amount of current supplied to a vehicle signalling lamp comprising, in combination, an electrically conductive body member having a bore extending therethrough, an elongated resistance element extending parallel to the axis of said bore at one end thereof, means insulating said resistance element from said body member, a fluid pressure responsive member reciprocably carried in the other end of said bore, a movable contact member reciprocable along the axis of said bore and having one end which engages said fluid pressure responsive member and another end which slides along said resistance element, said body member, fluid pressure responsive member and contact member being electrically interconnected, an annular shoulder formed in said bore substantially midway between said resistance element and said fluid pressure responsive member and having a surface which lies in a plane substantially perpendicular to the axis of said bore, first and second abutting and separable disc-like members arranged to engage said annular shoulder, a first spring positioned between an end of said fluid pressure responsive member and a first of said disc-like members, a second spring positioned between said resistance element and the second of said disc-like members for forcing the disc-like members into engagement with said annular shoulder, said second spring having a higher force-deflection ratio than said first spring, means on said movable contact member for engaging the second disc-like member after the fluid pressure responsive member and contact member have moved forward by a predetermined amount to compress said first spring, and connections for applying fluid pressure to the fluid pressure responsive member whereby the last-mentioned member and the contact member are urged toward said one end of the bore against the force of said first and second springs.

References Cited in the file of this patent

UNITED STATES PATENTS

| | | |
|---|---|---|
| 1,784,884 | Smith | Dec. 16, 1930 |
| 2,091,086 | Taylor | Aug. 24, 1937 |
| 2,510,785 | Potts et al. | June 6, 1950 |
| 2,515,867 | Fuller | July 18, 1950 |
| 2,751,458 | Kayuha | June 19, 1956 |